US012807248B2

(12) United States Patent
Bousquet, II et al.

(10) Patent No.: US 12,807,248 B2
(45) Date of Patent: Nov. 24, 2026

(54) KINGPIN ASSEMBLY

(71) Applicant: SmithCo Mfg. Inc., Le Mars, IA (US)

(72) Inventors: Orelous Paul Bousquet, II, Elk Point, SD (US); Yoon-Kai Lee, Howell, MI (US)

(73) Assignee: SMITHCO MFG., INC, Le Mars, IA (US)

( * ) Notice: Subject to any disclaimer, the term of this patent is extended or adjusted under 35 U.S.C. 154(b) by 512 days.

(21) Appl. No.: 18/466,076

(22) Filed: Sep. 13, 2023

(65) Prior Publication Data

US 2024/0083526 A1 Mar. 14, 2024

Related U.S. Application Data

(60) Provisional application No. 63/375,421, filed on Sep. 13, 2022.

(51) Int. Cl.
*B62D 53/08* (2006.01)

(52) U.S. Cl.
CPC ................................ *B62D 53/0842* (2013.01)

(58) Field of Classification Search
CPC ....................... B62D 53/0842; B62D 53/0885; B62D 53/08; B62D 53/00; Y10T 403/32877
USPC .......................................................... 280/433
See application file for complete search history.

(56) References Cited

U.S. PATENT DOCUMENTS

| | | | | |
|---|---|---|---|---|
| 2,641,124 | A | | 6/1953 | Gallagher et al. |
| 2,656,706 | A | | 10/1953 | Lucas et al. |
| 2,714,016 | A | | 7/1955 | Smith |
| 2,831,699 | A | * | 4/1958 | Holmes .................. B60G 11/14 280/124.179 |
| 2,958,541 | A | | 11/1960 | Bär |
| 2,973,210 | A | | 2/1961 | Sandefur |
| 3,135,528 | A | | 6/1964 | Martin |
| 3,600,005 | A | | 8/1971 | Glaza |
| 3,633,941 | A | | 1/1972 | Pleier |
| 3,763,675 | A | | 10/1973 | Hofmeister et al. |
| 3,771,816 | A | | 11/1973 | Hord, Jr. |
| 3,807,766 | A | | 4/1974 | Pleier et al. |
| 3,811,708 | A | | 5/1974 | Baaso |
| 3,834,736 | A | | 9/1974 | Dodgson |
| 3,870,342 | A | | 3/1975 | Baxter et al. |
| 3,900,213 | A | | 8/1975 | Cunha |
| 3,922,897 | A | | 12/1975 | Mickelson |
| 4,121,853 | A | | 10/1978 | McKay |

(Continued)

FOREIGN PATENT DOCUMENTS

| | | | |
|---|---|---|---|
| BR | 202012031978 | U2 | 9/2014 |
| BR | 102018016503 | A2 | 4/2019 |

(Continued)

*Primary Examiner* — Jacob D Knutson
*Assistant Examiner* — Mitchell James Price
(74) *Attorney, Agent, or Firm* — David M. Breiner; BrownWinick Law Firm

(57) ABSTRACT

Disclosed is a kingpin assembly comprising a receiver housing, a collet sleeve in the receiver housing, a kingpin in the collet, a spring on the kingpin, a retainer cap on the spring, and a plurality of connectors connecting the receiver housing to the retainer cap. In one embodiment, the retainer cap exerts a pressure against the spring which in turn exerts pressure to a top of the king pin pressing the king pin and collet towards a bottom of the receiver housing.

16 Claims, 19 Drawing Sheets

(56) References Cited

U.S. PATENT DOCUMENTS

| | | | | |
|---|---|---|---|---|
| 4,254,967 | A | 3/1981 | Scanlon | |
| 4,339,140 | A | 7/1982 | Abolins | |
| 4,383,697 | A | 5/1983 | F'Geppert | |
| 4,457,531 | A | 7/1984 | Hünger | |
| 4,946,184 | A | 8/1990 | Larocco | |
| 5,104,138 | A | 4/1992 | Allen | |
| 5,137,298 | A | 8/1992 | Madura | |
| 5,351,511 | A | 10/1994 | Bernier | |
| 5,411,281 | A | 5/1995 | Poirier | |
| 5,419,576 | A | 5/1995 | Van Vleet | |
| 6,070,688 | A | 6/2000 | Schulz | |
| 6,099,015 | A | 8/2000 | Marcy | |
| 6,252,497 | B1 | 6/2001 | Dupay et al. | |
| 6,322,093 | B1 | 11/2001 | Athans et al. | |
| 6,565,109 | B1 | 5/2003 | Kloepfer | |
| 6,695,338 | B1 | 2/2004 | Roberts | |
| 6,773,023 | B2 | 8/2004 | Athans et al. | |
| 6,837,511 | B1 | 1/2005 | Johnson, III | |
| 6,846,002 | B2 | 1/2005 | Irgens et al. | |
| 6,848,282 | B2 | 2/2005 | Palzkill et al. | |
| 7,093,843 | B2 * | 8/2006 | Varela | B62D 7/18 280/93.512 |
| 7,121,574 | B2 | 10/2006 | Bouwkamp | |
| 7,125,033 | B2 | 10/2006 | Forrister | |
| 7,163,226 | B1 | 1/2007 | Norton et al. | |
| 7,257,904 | B1 | 8/2007 | Brown et al. | |
| 7,451,995 | B2 | 11/2008 | Bloodworth et al. | |
| 7,469,918 | B2 | 12/2008 | Kaleta | |
| 7,651,113 | B1 | 1/2010 | Mann | |
| 7,703,792 | B1 | 4/2010 | Heitzmann et al. | |
| 7,735,849 | B1 | 6/2010 | Mann | |
| 7,762,167 | B2 | 7/2010 | Lefebvre | |
| 7,766,361 | B2 | 8/2010 | Hungerink et al. | |
| 7,963,544 | B2 | 6/2011 | Harlin | |
| 8,100,427 | B2 | 1/2012 | Mater, Jr. et al. | |
| 8,490,986 | B1 | 7/2013 | Ostrander et al. | |
| 8,602,438 | B2 | 12/2013 | Arminak et al. | |
| 8,960,704 | B2 | 2/2015 | Terpsma et al. | |
| 9,205,883 | B2 | 12/2015 | Bennett et al. | |
| 9,290,071 | B2 | 3/2016 | McCoy et al. | |
| 9,975,588 | B2 | 5/2018 | Mohamad Jembari et al. | |
| 10,358,165 | B2 | 7/2019 | Reid | |
| 10,421,488 | B2 | 9/2019 | Lam et al. | |
| 10,589,585 | B2 | 3/2020 | Stanifer et al. | |
| 10,800,219 | B2 | 10/2020 | Harper | |
| 10,850,580 | B2 | 12/2020 | McCoy | |
| 10,882,553 | B2 | 1/2021 | Wilhelm | |
| 11,077,728 | B2 | 8/2021 | Fenton et al. | |
| 11,325,434 | B2 | 5/2022 | Pennington | |
| 11,685,450 | B2 | 6/2023 | Hartmann et al. | |
| 11,702,155 | B2 | 7/2023 | Schutt et al. | |
| 2001/0028160 | A1 | 10/2001 | Athans et al. | |
| 2008/0023939 | A1 | 1/2008 | Mater | |
| 2014/0339789 | A1 * | 11/2014 | Terpsma | B62D 53/08 280/433 |
| 2014/0339790 | A1 * | 11/2014 | Terpsma | B62D 53/08 280/433 |
| 2014/0361505 | A1 | 12/2014 | Ormiston et al. | |
| 2017/0183044 | A1 * | 6/2017 | Marquis | B62D 53/08 |
| 2021/0300136 | A1 | 9/2021 | Algüera et al. | |
| 2022/0153363 | A1 | 5/2022 | Kibler et al. | |

FOREIGN PATENT DOCUMENTS

| | | | |
|---|---|---|---|
| BR | 202020020440 | U2 | 3/2021 |
| CA | 2159946 | A1 | 4/1996 |
| CA | 2392663 | A1 | 1/2004 |
| CA | 2337744 | C | 8/2004 |
| CA | 2587696 | A1 | 11/2007 |
| CA | 2758009 | C | 6/2014 |
| CA | 2942920 | A1 | 10/2015 |
| CN | 101497348 | B | 7/2012 |
| CN | 204110192 | U | 1/2015 |
| CN | 204419840 | U | 6/2015 |
| CN | 204774437 | U | 11/2015 |
| CN | 206246519 | U | 6/2017 |
| CN | 206288102 | U | 6/2017 |
| CN | 107379888 | A | 11/2017 |
| CN | 209852000 | U | 12/2019 |
| CN | 110744976 | A | 2/2020 |
| CN | 110816186 | A | 2/2020 |
| CN | 108454333 | B | 1/2021 |
| CN | 113815642 | A | 12/2021 |
| CN | 113232469 | B | 4/2023 |
| DE | 1789487 | U | 5/1959 |
| DE | 2126809 | A1 | 12/1972 |
| DE | 3535154 | C2 | 10/1988 |
| DE | 4104796 | C1 | 6/1992 |
| DE | 9114940 | U1 | 3/1993 |
| DE | 3744307 | C2 | 4/1993 |
| DE | 4135726 | A1 | 5/1993 |
| DE | 4304857 | C2 | 8/1996 |
| DE | 19539998 | A1 | 4/1997 |
| DE | 29821604 | U1 | 2/1999 |
| DE | 19647211 | C2 | 5/2001 |
| DE | 20306057 | U1 | 7/2003 |
| DE | 102006012153 | B4 | 4/2010 |
| DE | 202009017772 | U1 | 5/2011 |
| DE | 102018216825 | A1 | 4/2020 |
| DE | 102019116064 | A1 | 12/2020 |
| DE | 202020104506 | U1 | 12/2021 |
| DE | 102019134012 | B4 | 11/2022 |
| EP | 0051464 | A3 | 2/1983 |
| EP | 0140195 | B1 | 7/1989 |
| EP | 0230493 | B1 | 3/1990 |
| EP | 0319765 | A3 | 6/1990 |
| EP | 0507342 | B1 | 11/1995 |
| EP | 0816211 | B1 | 12/2001 |
| EP | 1199547 | A3 | 7/2002 |
| EP | 2072382 | A1 | 6/2009 |
| EP | 2899101 | B1 | 3/2018 |
| EP | 3486151 | A1 | 5/2019 |
| EP | 3861848 | A1 | 11/2021 |
| EP | 4028313 | B1 | 2/2023 |
| FR | 1416159 | A | 10/1965 |
| GB | 810903 | A | 3/1959 |
| GB | 1183132 | A | 3/1970 |
| GB | 1294035 | A | 10/1972 |
| GB | 201616253 | | 11/2016 |
| IT | 1171742 | B | 6/1987 |
| JP | S57186588 | A | 11/1982 |
| JP | H0775989 | B2 | 5/1996 |
| JP | 2747441 | B2 | 5/1998 |
| JP | 6084156 | B2 | 2/2017 |
| KR | 10-2074647 | B1 | 2/2020 |
| SE | 8703990 | L | 4/1988 |
| WO | 95/15273 | A1 | 6/1995 |
| WO | 97/49600 | A1 | 12/1997 |
| WO | 99/54578 | A1 | 10/1999 |
| WO | 2009/000765 | A3 | 2/2009 |
| WO | 2017/13648 | A3 | 9/2017 |
| WO | 2021/026524 | A1 | 2/2021 |

* cited by examiner

TEST SETUP: FATIGUE TEST RD 1 70K lbf LOAD CYCLE TO FAILURE

Control Group King Pin Broke at about 43,000 cycles

Test Group King Pin broke at about 200,000 cycles

TEST SETUP: FATIGUE TEST RD 2 43K lbf 500K LOAD CYCLES
WITH 5K lbf PRESSING DOWN

KINGPIN ASSEMBLY

BACKGROUND

1. Field

Example embodiments relate to a kingpin assembly.

2. Description of the Related Art

Kingpins are commonly used to connect trucks to trailers. In most conventional systems the kingpin is mounted on the trailer and is received by jaws arranged on the truck. The jaws operate to clamp the kingpin thereby connecting the trailer to the truck.

SUMMARY

The inventor has discovered that when kingpins are used to connect a side dump trailer to a truck the kingpins experience stresses not typically generated in most tractor/trailer arrangements. These stresses could lead to an early failure of the kingpin. In view of this the inventor has designed a novel kingpin assembly. While the kingpin assembly has been found to be particularly useful for side dump trailers the invention is not limited thereto as the new kingpin assembly is usable for all sorts of trailers.

In an example embodiment, the kingpin assembly includes a receiver housing, a collet sleeve in the receiver housing, a kingpin, in the receiver housing, a Belleville spring on the kingpin, a retainer cap, and a plurality of bolts connecting the retainer cap to the receiver housing.

BRIEF DESCRIPTION OF THE DRAWINGS

Example embodiments are described in detail below with reference to the attached drawing figures, wherein.

DETAILED DESCRIPTION

Figure 1:
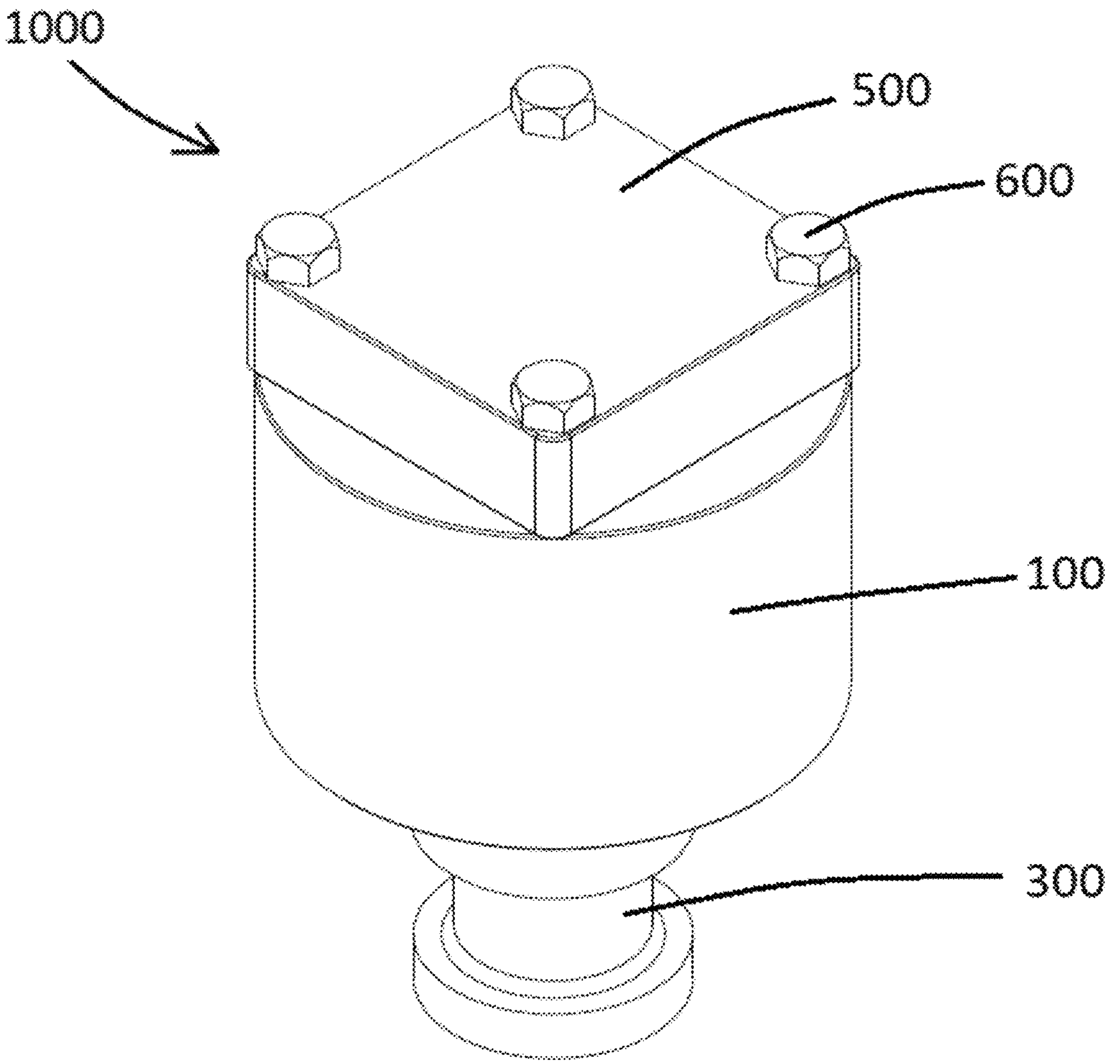
FIG. 1 is a perspective view of a kingpin housing.

Example embodiments will now be described more fully with reference to the accompanying drawings. Example embodiments are not intended to limit the disclosure since the disclosure may be embodied in different forms. Rather, example embodiments are provided so that this disclosure will be thorough and complete, and will fully convey the scope of the disclosure to those skilled in the art. In the drawings, the sizes of components may be exaggerated for clarity.

In this application, when a first element is described as being “on” or “connected to” a second element, the first element may be directly on or directly connected to the second element or may be on or connected to an intervening element that may be present between the first element and the second element. When a first element is described as being “directly on” or “directly connected to” a second element, there are no intervening elements. In this application, the term “and/or” includes any and all combinations of one or more of the associated listed items.

In this application, spatially relative terms merely describe one element’s relationship to another. The spatially relative terms are intended to encompass different orientations of the structure. For example, if a first element of a structure is described as being “above” a second element, the term “above” is not meant to limit the disclosure since, if the structure is turned over, the first element would be “beneath” the second element. As such, use of the term “above” is intended to encompass the terms “above” and “below”. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Example embodiments relate to a kingpin assembly.

Figure 2:
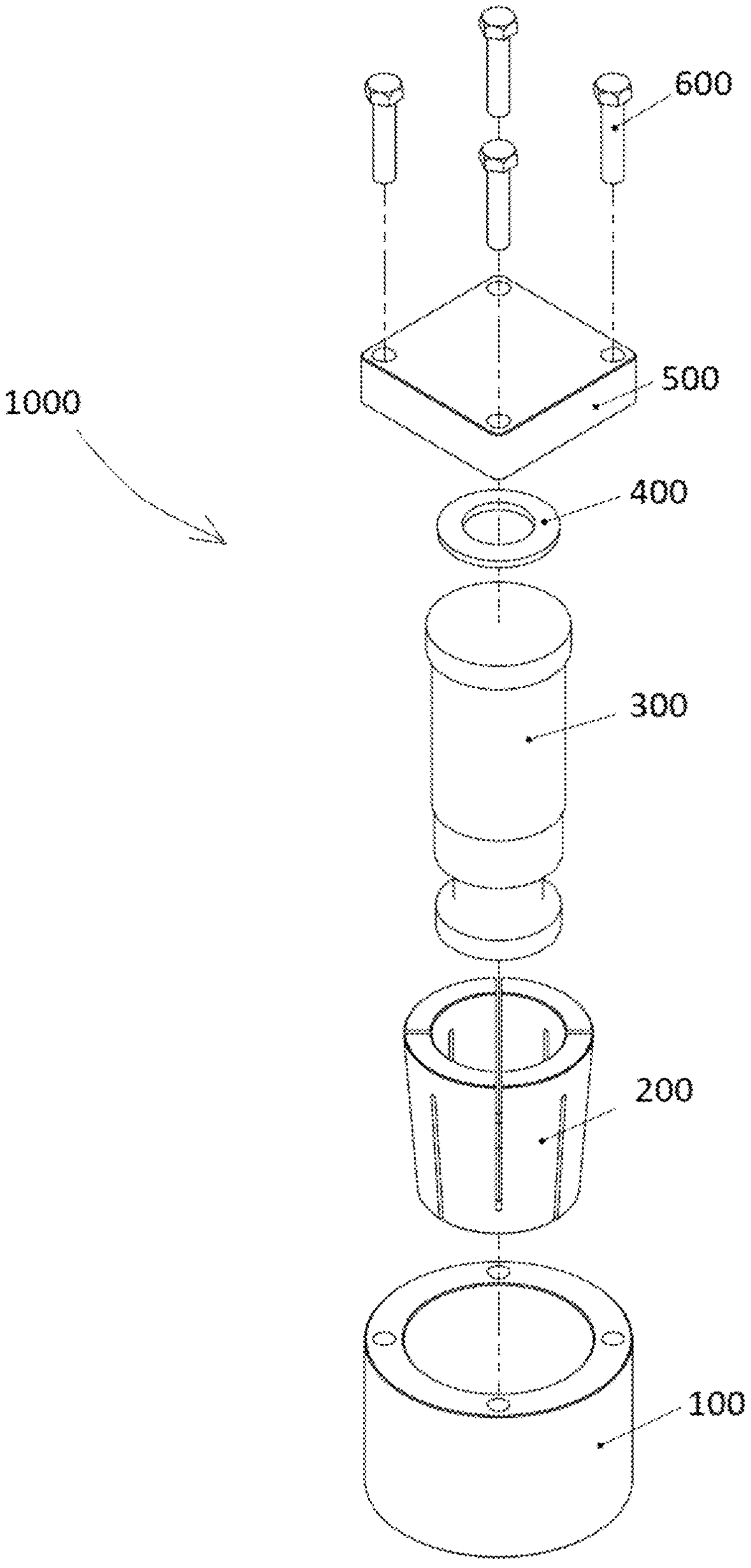
FIG. 2 is an exploded view of the kingpin housing.
Figure 8:
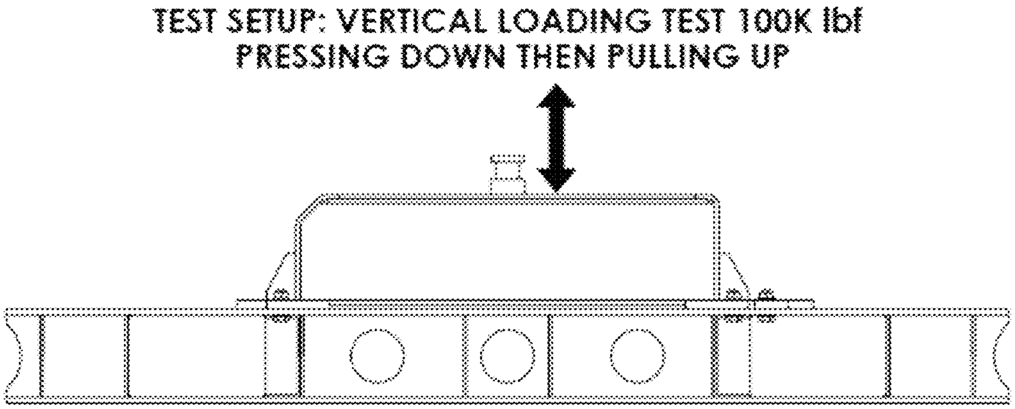
FIG. 8 is a view of a test assembly where the kingpin and housing are tested for vertical displacement.

FIG. 1 is a perspective view of a kingpin assembly 1000, FIG. 2 is an exploded view of the kingpin assembly 1000, and FIG. 8 is a section view of the kingpin assembly 1000. Referring to FIGS. 1, 2, and 8 the kingpin assembly 1000 is comprised of a receiver housing 100, a collet sleeve 200, a kingpin 300, a spring 400, a retainer cap 500, and connectors 600. What is shown in the figures is for purpose of illustration only and should not be construed as limiting the invention.

Figure 3A:
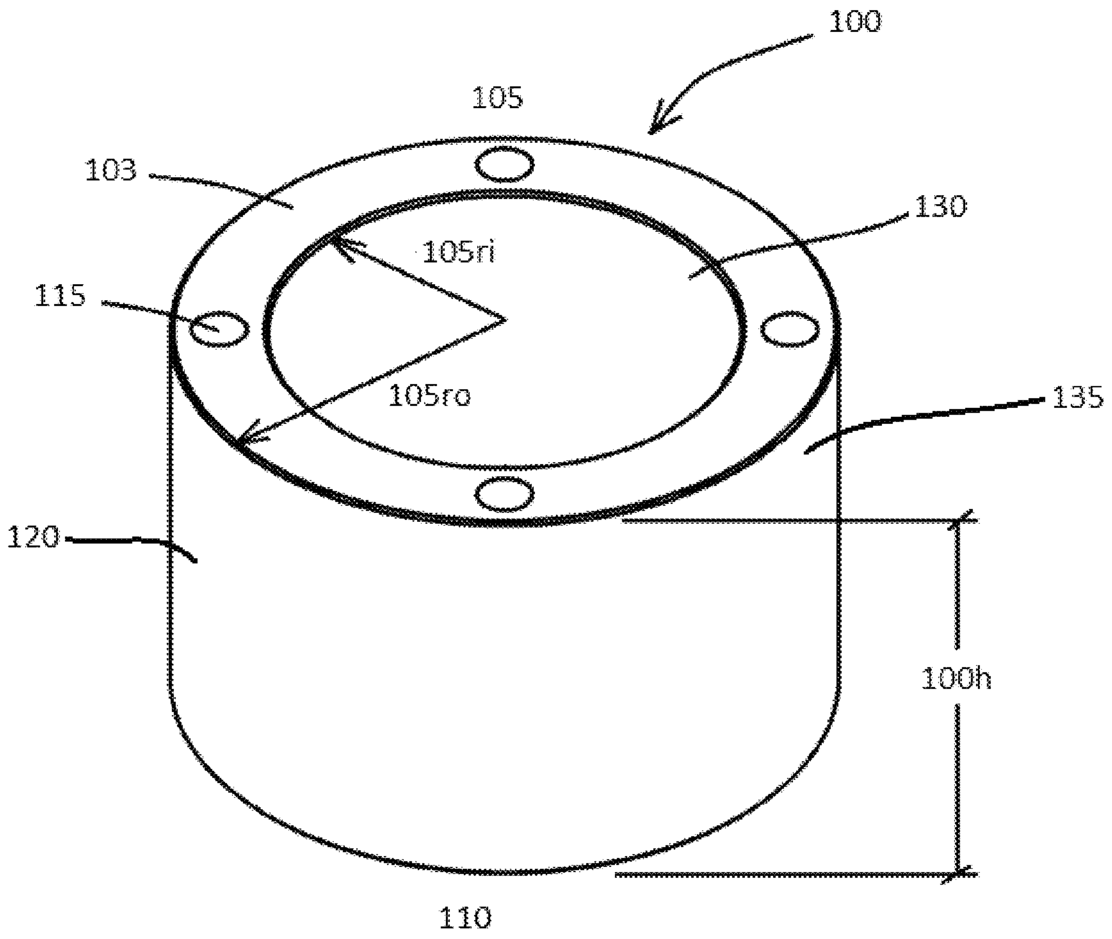
FIG. 3A is a view of a receiver housing in accordance with example embodiments.
Figure 3B:
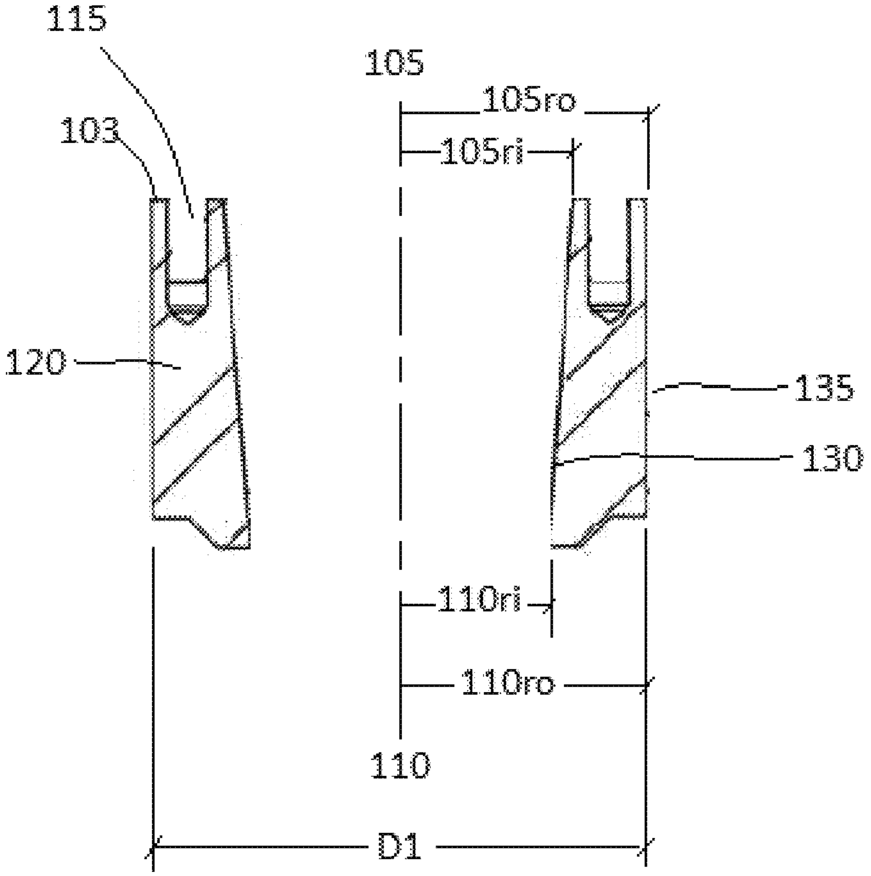
FIG. 3B is a section view of the receiver housing in accordance with example embodiments.

As shown in FIGS. 1 and 2, and more particularly in FIGS. 3A and 3B, the receiver housing 100 may resemble a short hollow cylinder having a first end 105 and a second end 110. Between the first end 105 and 110 and the second end is a wall 120 having an inner surface 130 and an outer surface 135. The inner surface 130 may have radius 105*ri* near the first end 105 and a radius 110*ri* near the second end 110. The outer surface 135 may have a radius 105*ro* near the first end 105 and a radius 110*ro* near the second end 110. The radius 105*ro* near the first end 105 may be substantially the same size as the radius 110*ro* at the second end 110. A such, the outer surface 135 may resemble a cylinder having diameter of D1. The radius 105*ri*, however, may be larger than the radius 110*ri*. Thus, the inner surface 130 may resemble more of a truncated cone. In example embodiments a thickness at one end of the receiver housing 100 may be somewhat thicker than a thickness at a second end of the receiver housing 100. For example, the thickness of the receiver housing 100 at the first end 105 may less than the thickness of the receiver housing 100 at the second end 110. In FIG. 3B the inner surface 130 is shown as varying linearly with the depth of the receiver housing 100, but this example feature is not meant to limit the invention.

Figure 4A:
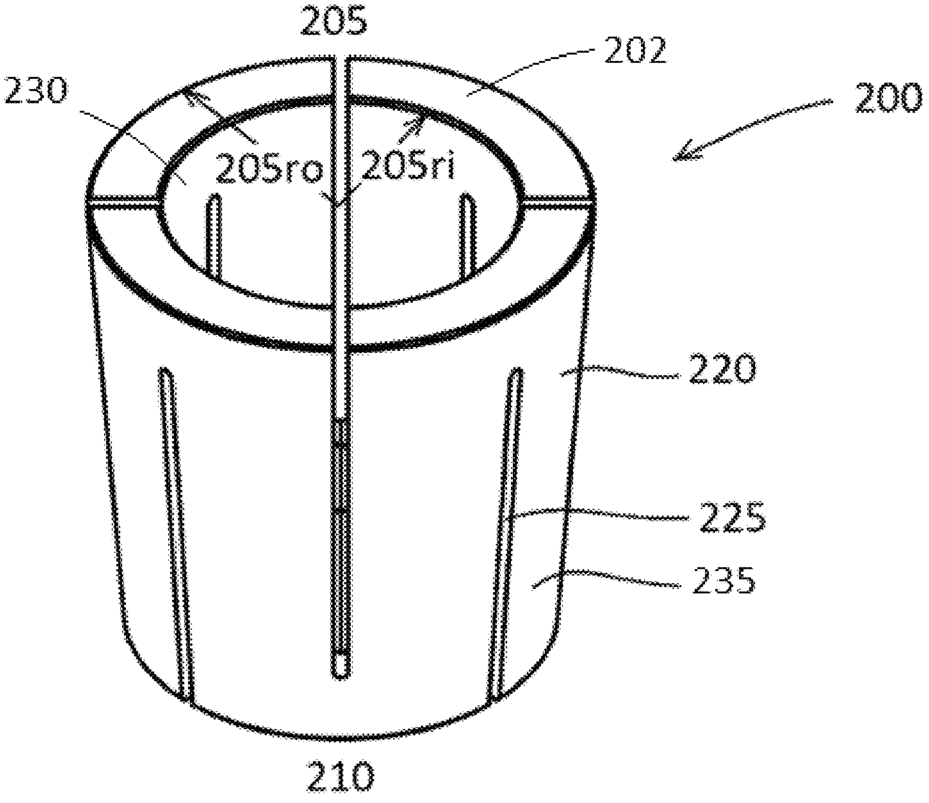
FIG. 4A is a view of a collet sleeve in accordance with example embodiments.
Figure 4B:
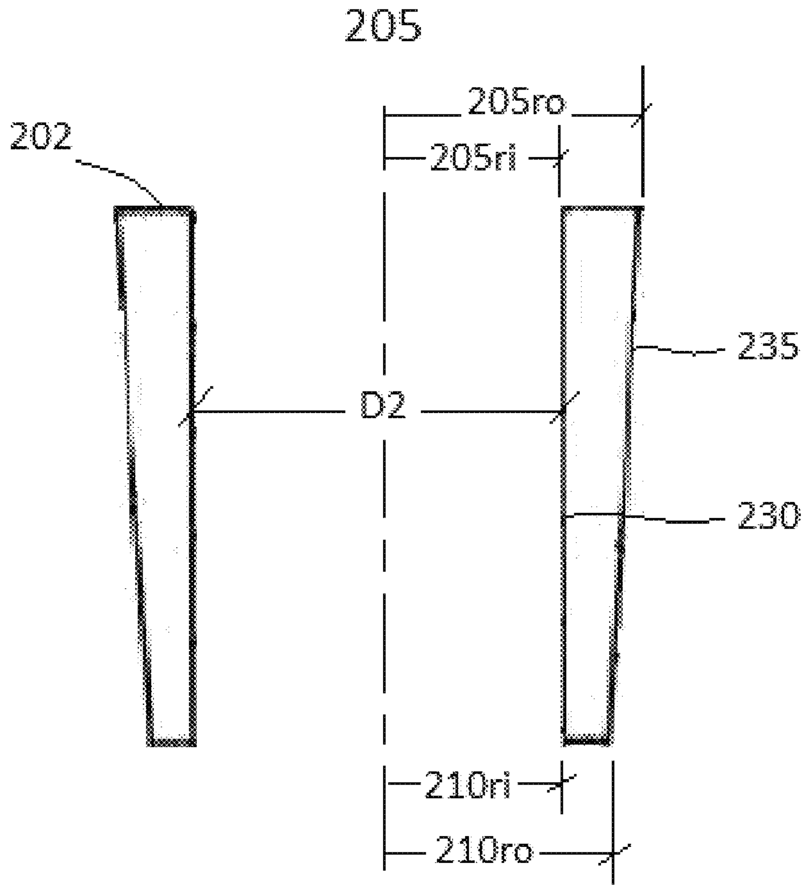
FIG. 4B is a section view of the collet sleeve in accordance with example embodiments

In example embodiments the wall 120 may have a height 100*h* which, in one nonlimiting example embodiment, is about 4.25 inches. This dimension, however, are merely for the purpose of illustration and is not meant to limit the invention. An upper surface 103 of the receiver housing 100 may include a plurality of holes 115 to receive the previously described connectors 600, however, other types of connectors may allow the retainer cap 500 to connect to the receiver housing 100. Thus, it may not be necessary for the upper surface 103 to include the plurality of holes 115 illustrated in the figures Turning now to FIGS. 4A and 4B, the collet 200 resembles a hollow truncated cone having a first end 205 and a second end 210. Between the first end 205 and the second end 210 is a wall 220 having an inner surface 230 and an outer surface 235 The inner surface 230 may have radius 205*ri* near the first end 205 and a radius 210*ri* near the second end 210. The outer surface 235 may have a radius 205*ro* near the first end 205 and a radius 210*ro* near the second end 210. The radius 210*ri* near the second end 210 may be substantially the same size as the radius 205*ri*. A such, the inner surface 230 may resemble a cylinder having diameter of D2. The radius 205*ro*, however, may be larger than the radius 210*ro*. Thus, the outer surface 235 may resemble more of a truncated cone. In example embodiments the wall 220 may have slots 225 imparting flexibility to the collet 200. When installed, the collet 200 resides in the receiver housing 100. That is, when installed, the outer surface 235 of the collet 200 presses against an inner surface 130 of the receiver housing 100.

In example embodiments a thickness at one end of the collet 200 may be somewhat thicker than a thickness at a second end of the collet 200. For example, the thickness of the collet 200 at the first end 205 may be thicker than the thickness of the collet 200 at the second end 210. In one embodiment, the slope of the outer surface 235 may substantially match a slope of an inner surface 130 of the receiver housing 100.

Figure 5A:
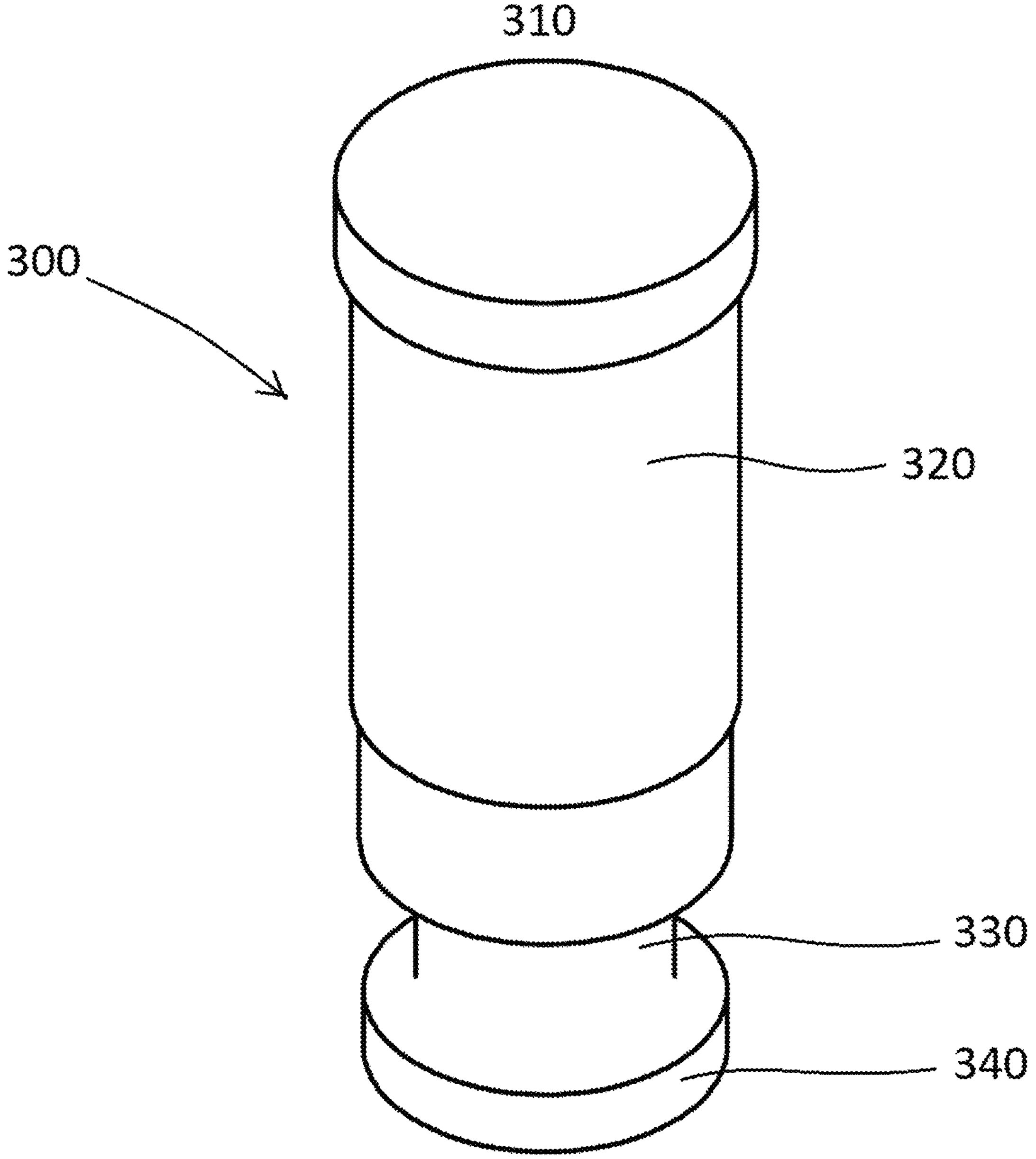
FIG. 5A is a view of a kingpin in accordance with example embodiments.
Figure 5B:
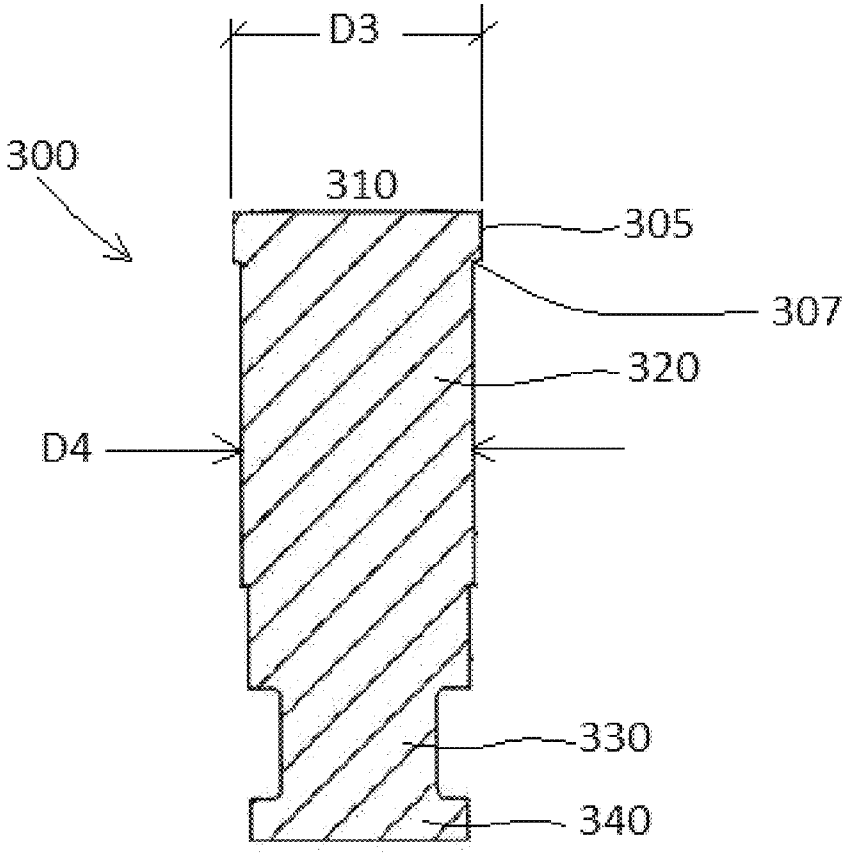
FIG. 5B is a section view of the kingpin in accordance with example embodiments.
Figure 6:
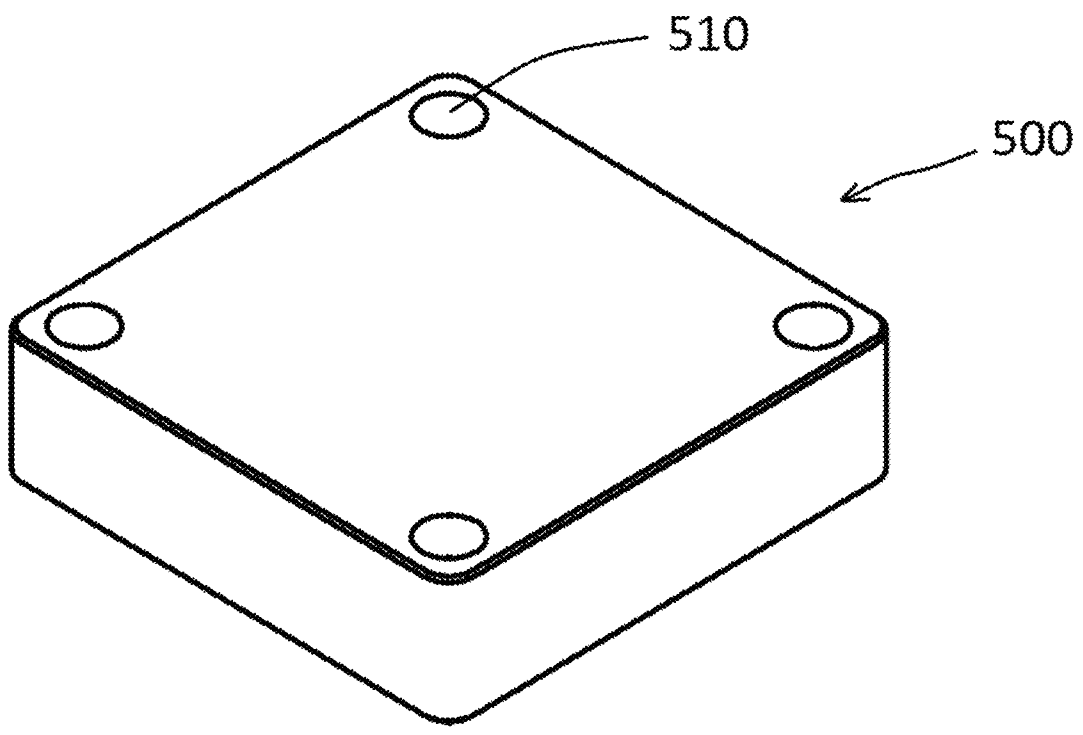
FIG. 6 is a view of a retainer cap in accordance with example embodiments.

As shown in FIG. 5, the kingpin 300 may be a conventional kingpin and may resemble a stepped cylinder having a first end 310, a body 320, a neck 330, and a second end 340. Near the first end 310 is a head 305 which may resemble a short cylinder having a diameter D3. The body 320, in one nonlimiting embodiment, may resemble a somewhat longer cylinder having a diameter D4 which is smaller than the diameter D3 of the head 305. This forms a shoulder 307 which may rest on and upper surface 202 of the collet 200. For purpose of illustration only, the diameter D4 of the body 320 may be about the same size or slightly smaller than the diameter D2 of the collet 200 and may be about 2.875 inches, the neck 330 may have a diameter of about 2 inches, and the second end 340 may have a diameter of about 2.182 inches. These dimensions, however, are not critical to the design as the sizes may vary from one embodiment to another.

Figure 7:
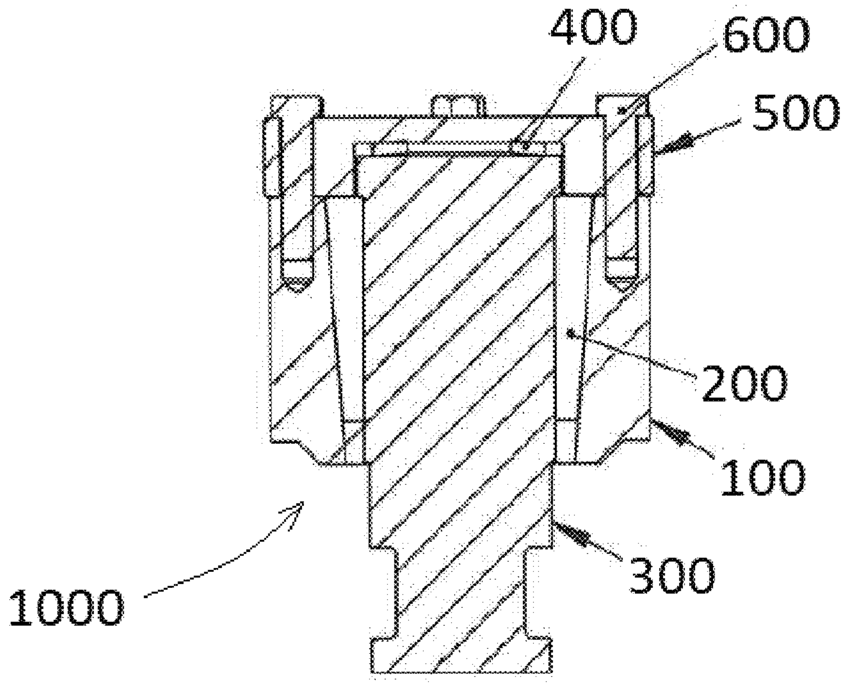
FIG. 7 is a section view of the kingpin housing.

As described above, the body 320 may resemble a cylinder having an outer diameter D4. The outer diameter D4 may be about the same size, or slightly smaller than, the inner diameter D2 of the collet 200. This allows the body 320, the neck 330, and the second end 340 to pass through the collet 200 but prevents the head 305 from passing through as shown in at least FIG. 7 since the diameter D3 of the head is larger than the diameter D2 of the collet 200.

The spring 400 may be any suitable elastic member, however, the inventors have found that configuring the spring as a Belleville disk spring is suitable for this purpose. Because Belleville disk springs are well known in the art a detailed description thereof is omitted for the sake of brevity. Other elastic members, such as, but not limited to coil springs, wave springs, or rubber blocks are also usable as an elastic member.

The retainer cap 500, as shown in the figures, may resemble a plate having a plurality of holes 510 to facilitate connecting the retainer cap 500 to the receiver housing 100 via the connectors 600. It is understood retainer cap 500 may connect to the receiver housing 100 by alternative means, thus, having the plurality of holes 510 may not be necessary in some embodiments.

The connectors 600, in one embodiment, may be hex head bolts. Thus, one skilled in the art would understand the connectors 600 may have a threaded surface, as is typical in the art. Thus, one skilled in the art would understand that in at least one example embodiment, the plurality of holes 115 in the receiver housing 100 may have threaded surfaces to engage the threads of the connectors 600.

The kingpin assembly 1000, in one nonlimiting example embodiment, may be assembled by placing the kingpin 300 into the collet sleeve 200. Thereafter the collet sleeve 200 may be inserted into the receiver housing 100. After that the spring 400 may be placed on the first end 310 of the kingpin 300 and the retainer cap 500 may be placed on the spring 400 in such a way that the plurality of holes 510 of the retainer cap 500 are aligned with the plurality of holes 115 of the receiver housing 100. After that, the connectors 600 may be passed through the plurality of holes 510 of the retainer cap 500 and into the plurality of holes 115 of the receiver housing 100 where they are turned to tighten the connection between the retainer cap 500 and the receiver housing 100. As one skilled in the art will appreciate as the connectors 600 are tightened the retainer cap 500 moves towards the retainer housing 100 which causes the kingpin 300 and the collet 200 to press against the retainer housing 100. This may cause the wall 220 of the collet 200 to contract and press against the inner surface 120 of the receiver housing 100 as well as the outer surface 320 of the kingpin 300. This promotes a relatively tight fit between the collet 200 and the receiver housing 100 and between the collet 200 and the kingpin 300. Thus, in order to promote easy disassembly, it may be advisable to apply a high pressures anti-seize lubricant to the outer surfaces of the kingpin 300 and the inner surface 120 of the receiver housing 100.

Figure 15:
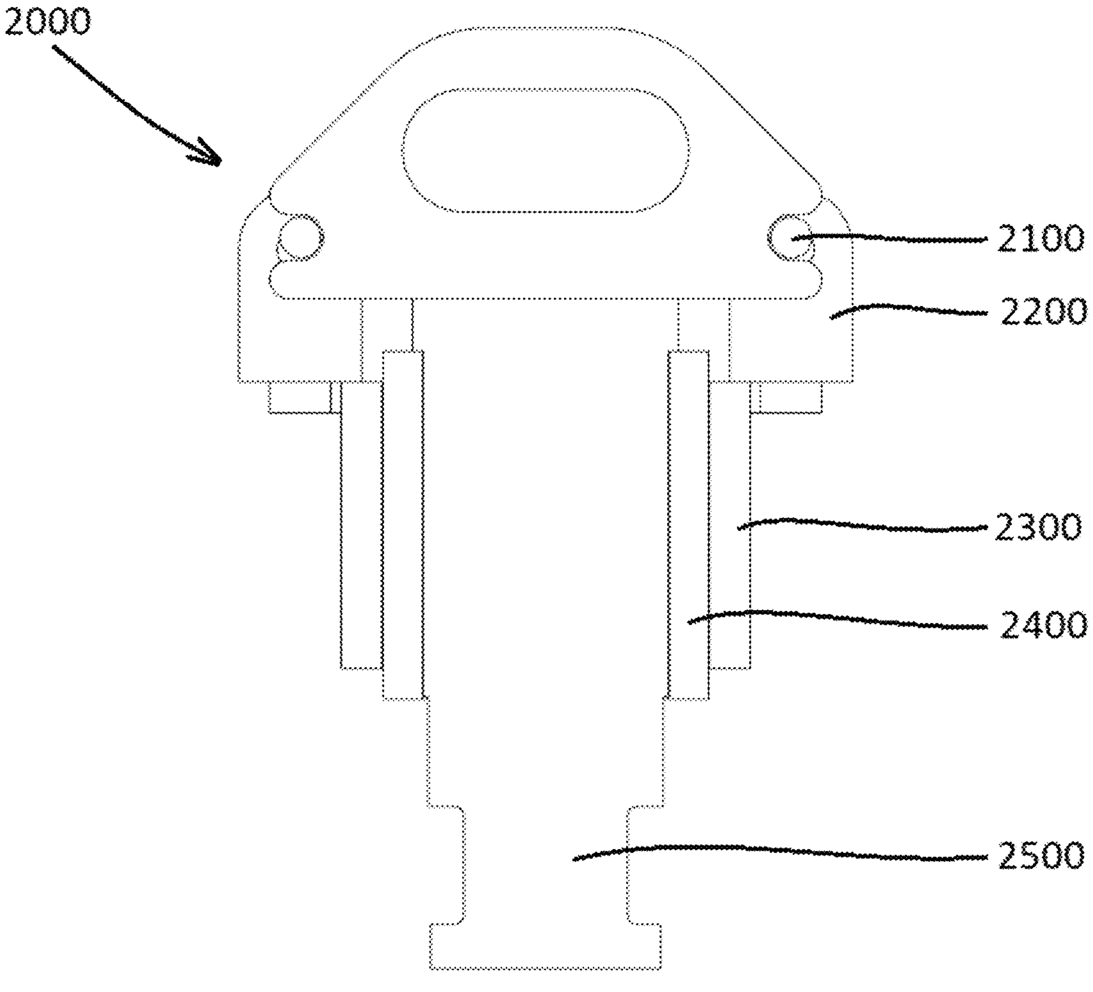
FIG. 15 PRIOR ART
FIG. 15 is a section view of a conventional kingpin housing and kingpin.

The new kingpin assembly 1000 has been tested and shown to have superior properties compared to conventional kingpin assemblies. The tests were developed based on the SAE J133 standards for testing commercial trailer kingpins. The new kingpin design 1000 (test group) was tested against a conventional kingpin design 2000 (control group) illustrated in FIG. 15. As one skilled in the art would readily appreciate, the conventional kingpin design 2000 includes a drop-in kingpin with handle 2500 having a body inserted into an inner bushing 2400 surrounded which is surrounded by an outer bushing 2500. The inner bushing 2400 resembles a hollow cylinder having an inner diameter about the same size as (or slightly larger than) the outer diameter of the body of the drop-in kingpin 2500. This allows the drop-in kingpin 2500 to be laterally restrained by the inner and outer bushings 2400 and 2300. The outer bushing 2300 also resembles a hollow cylinder having an inner radius about the same size (or slightly larger than) an outer radius of the inner bushing 2400. The drop-in kingpin 2500 is held in place (vertically restrained) by retainer tabs 2200 and bolts 2100. Both groups used identical Holland drop in kingpins with only the difference being how the kingpin was housed within a $5^{th}$ wheel assembly.

The test setup included two hydraulic cylinders for the testing. One hydraulic cylinder was mounted vertically for vertical load testing and the other for fore and aft fatigue testing. To measure the displacement of the kingpin string potentiometers were mounted to various locations of the 5th wheel assembly and test equipment. This allowed for results to analyze where movement was coming from (fixture vs. sample).

Figure 9:
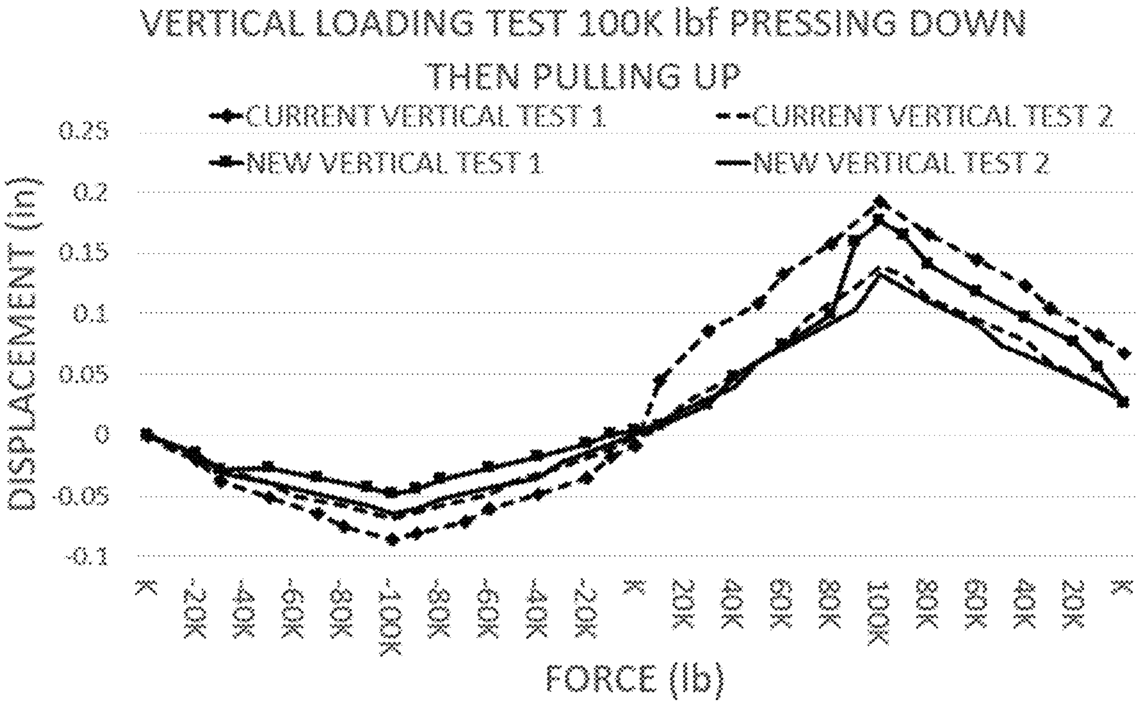
FIG. 9 is a graph showing experimental results of the kingpin and housing versus a conventional kingpin and housing.

Applicants conducted a first test which included a complete 5th wheel assembly including the kingpin was bolted to a fixture which was bolted to a concrete floor. In short, this test was a vertical load test based on SAEJ133 spec test 5. In this test a large hydraulic cylinder was used to push down and pull up on the kingpin and 5th wheel plate using a clamping fixture made to simulate the jaws of a 5th wheel on a tractor/trailer. The cylinder pushed down and pulled up vertically with 100,000 lbf as shown in FIG. 8. The new kingpin assembly 1000 showed 27% less movement on the vertical push and 7% less movement on the vertical pull when compared to the control group. Results are shown in FIG. 9.

Figure 10:
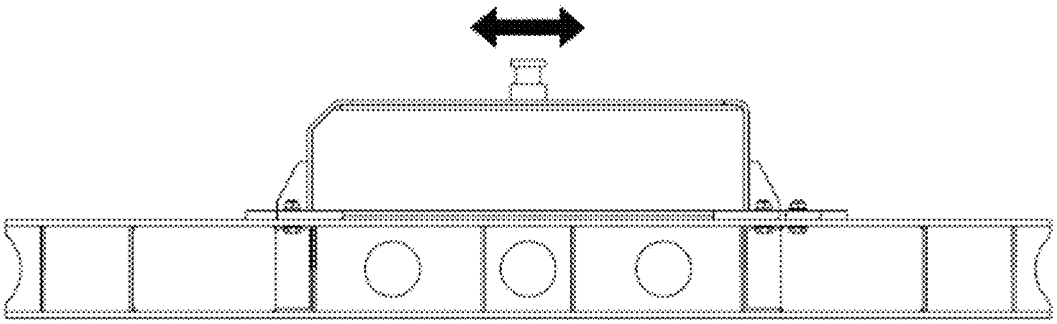
FIG. 10 is a view of a test fatigue assembly where the kingpin and housing are tested against horizontal loading.
Figure 11:
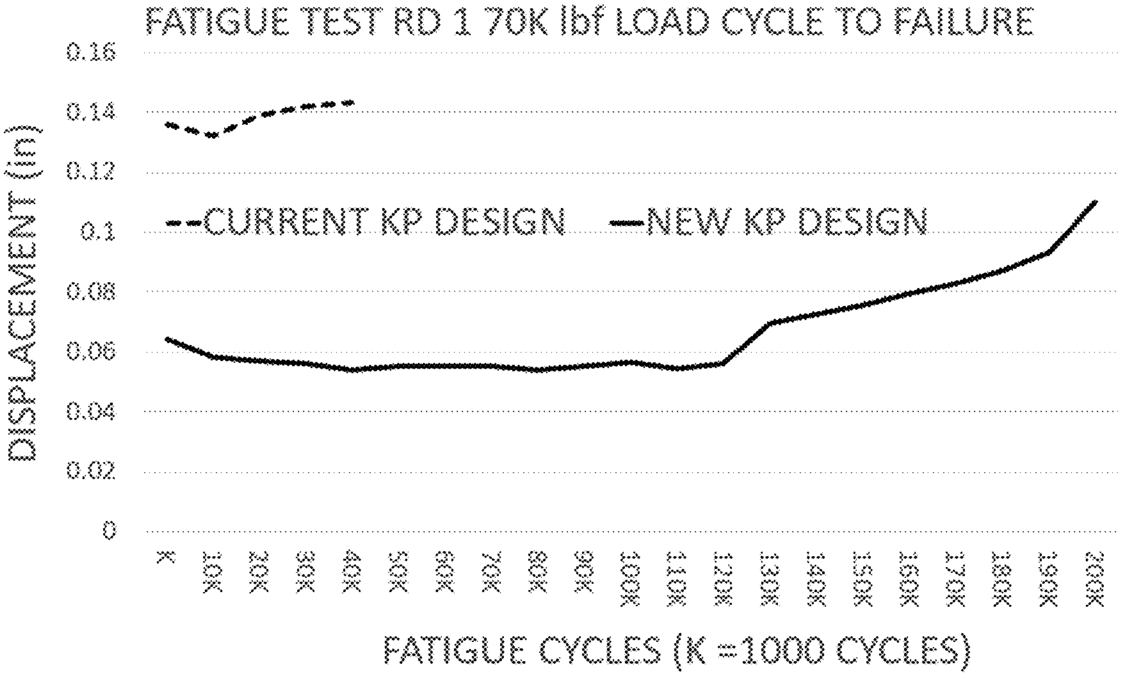
FIG. 11 is a graph showing experimental results of the kingpin and housing versus a conventional kingpin and housing subject to the horizontal loading.
Figure 12A:
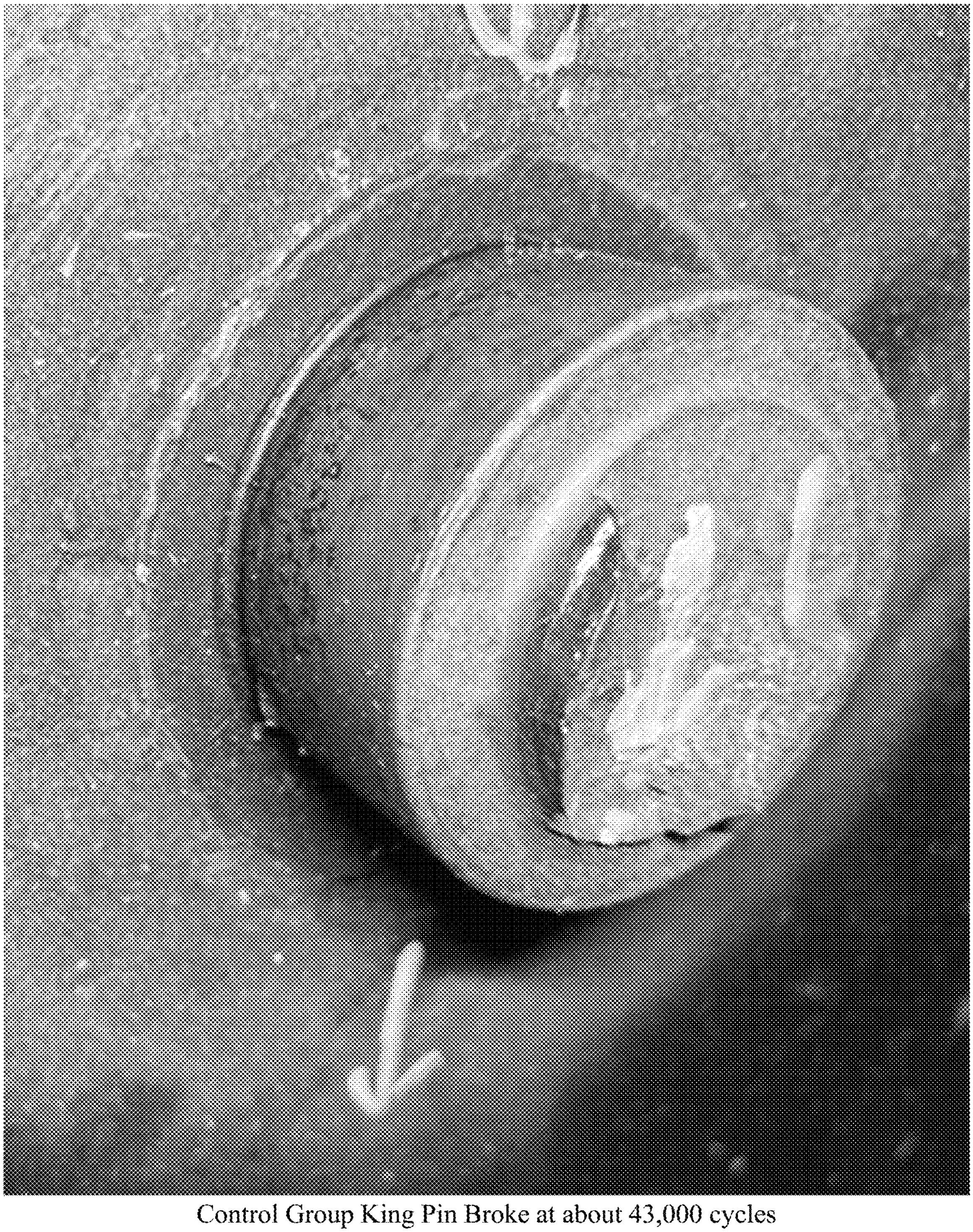
FIG. 12A is a photograph of a fatigued kingpin when supported by a conventional housing.
Figure 12B:
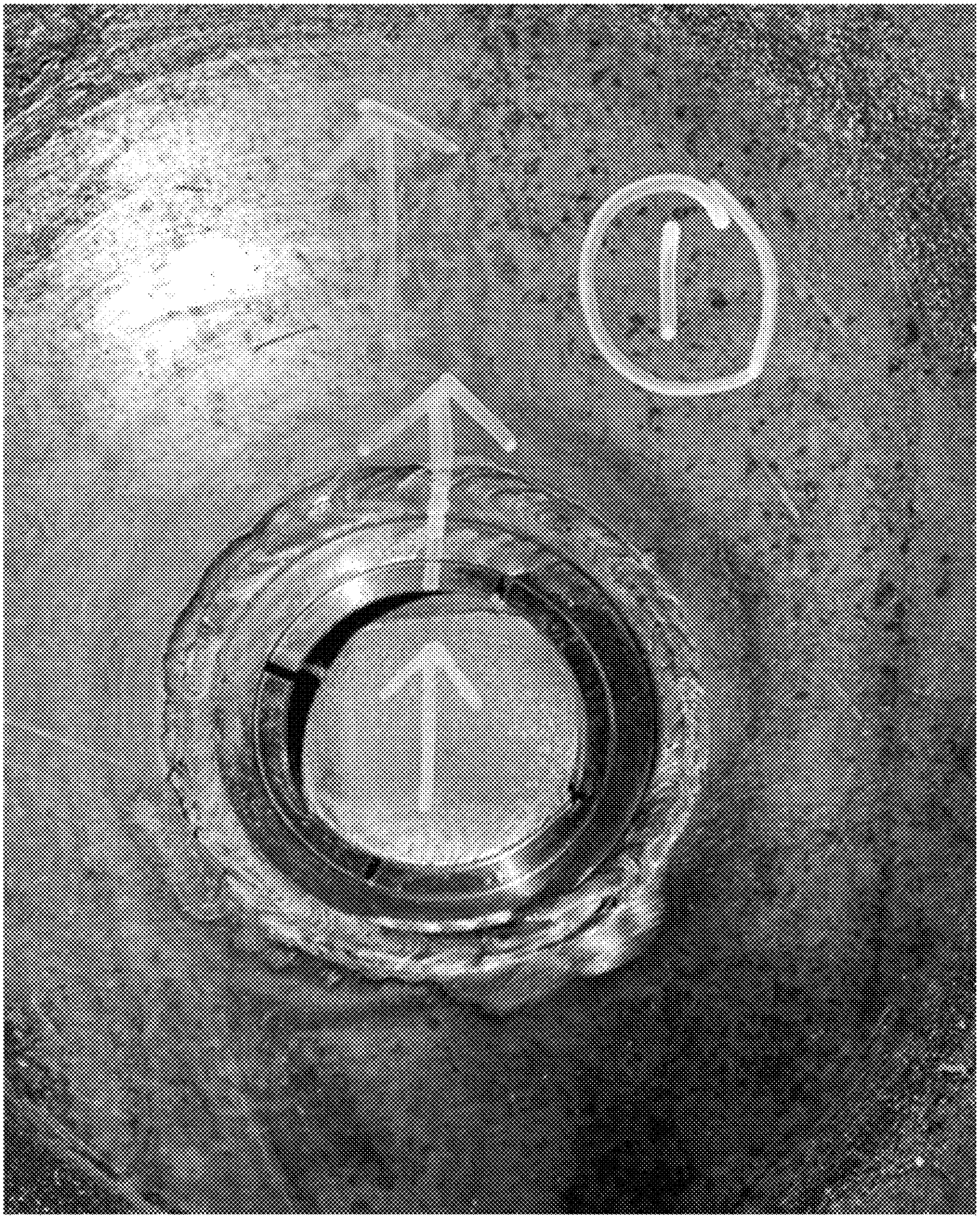
FIG. 12B is a photograph of a fatigued kingpin when supported by the housing of example embodiments.

Applicants also conducted a second test based on SAE J133 Spec test 2. The second test was to test the fatigue life of the kingpin housing while cycling forces in the fore and aft direction (as shown in FIG. 10). In this test a push-pull bar was used to clamp around the kingpin and apply 70,000 lbf in the fore and aft direction at a 2 Hz Frequency. This was done for both the test group and the control group. The control group saw a starting displacement of 0.136" during the cycle of 70,000 lbf fore and aft. The test group had a starting displacement of 0.064". This shows the test group has 53% less play, or slop, in the joint thanks to the design enhancements of how the removable kingpin is seated (i.e. seated by the receiver housing 100, the collet sleeve 200, the spring 400, the retainer cap 500, and the connectors 600). Each test resulted in a failure of the kingpin itself (not the housing). As shown in FIG. 11, the control group failure occurred at roughly 43,000 cycles while the test group failure occurred at roughly 200,000 cycles. This is a 365% improvement in reliability of components, although again it was the kingpin itself that broke. Although some increase in the fatigue life of the kingpin was anticipated, a 365% increase was not.

Figure 13:
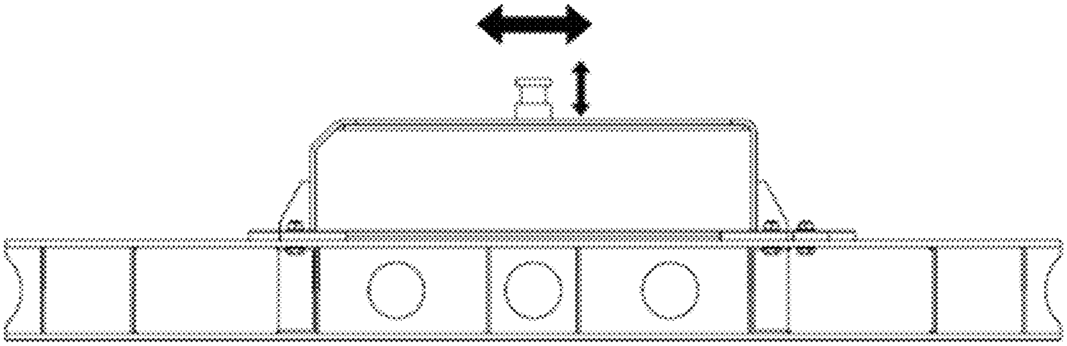
FIG. 13 is a view of a test fatigue assembly where the kingpin and housing are tested against horizontal loading.
Figure 14:
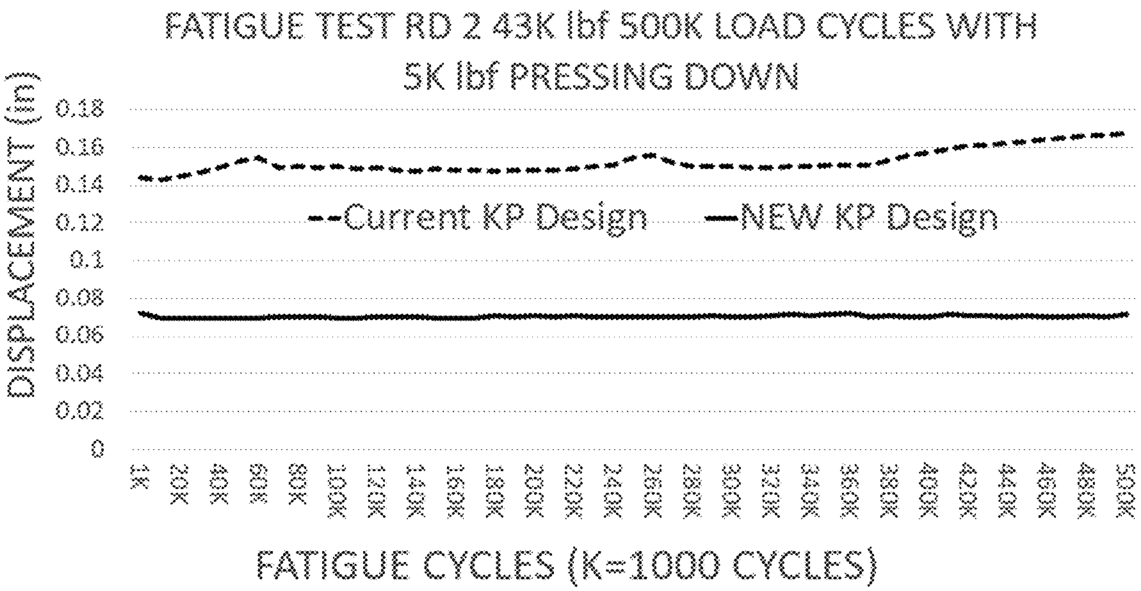
FIG. 14 is a graph showing experimental results of the kingpin and housing versus a conventional kingpin and housing subject to the horizontal and vertical loading.

Applicants conducted a third test based on SAE J133 Spec test 2. The third test was to study the fore and aft reliability of the kingpin assembly 1000. For the second round of fatigue testing, the force in the fore and aft direction was dropped to 43,000 lbf. The 43,000 lbf number was chosen based off the KingPin Manufacturer's (SAF Holland) D-value rating for their kingpin. It was also observed that there was significant rocking of the 5th wheel assembly on both groups during initial fatigue testing. Upon inspection the support structure frame had cracked under the stress that was applied. This was then reinforced with additional steel plating. 5,000 lbf was added in the vertical direction as shown in FIG. 13. This was to simulate the tongue weight of a trailer pushing down on a fifth wheel plate. The kingpin was once again subjected to fore and aft force cycling, this time with 43,000 lbf at 2 Hz frequency. Both test and control groups were run until either 500,000 cycles or failure. Both the control and test group survived the 500,000 cycle test. The Control group had a starting displacement of 0.144" and a final displacement of 0.168". This was a 16% increase in play over the life cycle testing. The test group had a starting displacement of 0.072" and a final displacement of 0.072". The test group had exactly half the initial play when forces were applied fore and aft. After 500,000 cycles the amount of movement from the kingpin housing and 5th wheel assembly had not increased as shown in FIG. 14.

In view of the aforementioned testing, it is clear the kingpin assembly 1000 of example embodiments is superior to conventional kingpin assemblies in that they show less vertical movement when subjected to vertical forces, increase the fatigue life of a kingpin, and resist displacements even after 500,000 cycles of loading.

What we claim is:

1. A kingpin assembly comprising:

a receiver housing;

a collet sleeve in the receiver housing;

a kingpin in the collet sleeve;

a spring on the kingpin;

a retainer cap on the spring; and a plurality of connectors connecting the receiver housing to the retainer cap.

2. The kingpin assembly of claim 1, wherein the spring is a Belleville spring.

3. The kingpin assembly of claim 1, wherein the plurality of connectors are a plurality of threaded members.

4. The kingpin assembly of claim 1, wherein the receiver housing has an inside surface that varies from a top of the receiver housing to a bottom of the receiver housing.

5. The kingpin assembly of claim 4, wherein the inside surface varies linearly.

6. The kingpin assembly of claim 1, wherein an outside surface of the collet sleeve exerts a pressure against an inside surface of the receiver housing.

7. The kingpin assembly of claim 6, wherein an inside surface of the collet sleeve exerts a pressure against an outside surface of the kingpin to inhibit lateral motion of the kingpin.

8. The kingpin assembly of claim 1, wherein the retainer cap exerts a pressure against the spring which in turn exerts pressure to a top of the king pressing the kingpin and collet sleeve towards a bottom of the receiver housing.

9. The kingpin assembly of claim 8, wherein a kingpin shoulder exerts a pressure against a top of the collet sleeve to bias the collet sleeve towards a bottom of the receiver housing and wherein the collet sleeve has an inside surface that applies a pressure to the kingpin such that as the pressure applied against the top of the collet sleeve by the kingpin shoulder increases the pressure exerted by the inside surface of the collet sleeve against the kingpin increases.

10. The kingpin assembly of claim 9, wherein the pressure exerted by the retainer cap to the spring, kingpin and collet sleeve is controlled by the plurality of connectors.

11. The kingpin assembly of claim 1, wherein the collet sleeve has a first end and a second end, an inner surface between the first end and the second end, and an outer surface between the first end and the second end, the inner surface resembling a cylindrical surface having a constant diameter and the outer surface resembling a truncated cone.

12. The kingpin assembly of claim 1, wherein the receiver housing has a first end and a second end and a wall between the first end and the second end, the wall having an inner surface which resembles a truncated cone.

13. The kingpin assembly of claim 12, wherein, when installed, an outer surface of the collet sleeve presses against the surface of the receiver housing.

14. The kingpin assembly of claim 1, wherein the collet sleeve includes a plurality of slots imparting flexibility to the collet sleeve.

15. The kingpin assembly of claim 1, wherein the receiver housing has a top surface with a plurality of apertures configured to receive the plurality of connectors.

16. A kit comprising:

a receiver housing;

a collet sleeve;

a spring;

a retainer cap; and a plurality of connectors, wherein a the collet sleeve is configured to insert in the receiver housing, the collet sleeve is configured to receive a kingpin, the spring is configured to fit between the kingpin and the retainer cap, and the plurality of connectors are configured to connect the receiver housing to the retainer cap.

* * * * *